United States Patent
Park et al.

(10) Patent No.: US 10,038,765 B2
(45) Date of Patent: Jul. 31, 2018

(54) METHOD OF TRANSMITTING AND RECEIVING DATA USING NEW LAYER IN WIRELESS COMMUNICATION SYSTEM

(71) Applicant: LG ELECTRONICS INC., Seoul (KR)

(72) Inventors: Sangmin Park, Seoul (KR); Sungduck Chun, Seoul (KR); Laeyoung Kim, Seoul (KR); Jinsook Ryu, Seoul (KR); Jaehyun Kim, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 195 days.

(21) Appl. No.: 15/197,882

(22) Filed: Jun. 30, 2016

(65) Prior Publication Data

US 2017/0006140 A1    Jan. 5, 2017

Related U.S. Application Data

(60) Provisional application No. 62/187,269, filed on Jul. 1, 2015.

(51) Int. Cl.
*H04L 12/28*  (2006.01)
*H04L 29/06*  (2006.01)
*H04L 12/741*  (2013.01)
*H04W 76/27*  (2018.01)
*H04L 12/721*  (2013.01)

(52) U.S. Cl.
CPC .............. *H04L 69/22* (2013.01); *H04L 45/66* (2013.01); *H04L 45/745* (2013.01); *H04W 76/27* (2018.02)

(58) Field of Classification Search
CPC ........ H04W 80/04; H04W 8/26; H04L 12/56; H04L 2012/56; H04L 29/0653; H04L 29/06095; H04L 49/3009; H04L 49/309; H04L 45/74; H04L 29/06163; H04L 12/5601; H04L 45/50
USPC .............................. 370/349, 389, 392, 395.5
See application file for complete search history.

(56) References Cited

U.S. PATENT DOCUMENTS 9,160,566 B2 * 10/2015 Ulupinar ............. H04L 12/4633
9,674,311 B2 *  6/2017 Lee ....................... H04W 28/06

* cited by examiner

*Primary Examiner* — Brenda H Pham
(74) *Attorney, Agent, or Firm* — Birch, Stewart, Kolasch & Birch, LLP

(57) ABSTRACT

A method of transmitting data and an eNB are disclosed. The method of transmitting data, which is received from a user equipment and transmitted to a network entity by an eNB, can include the steps of receiving a data packet of the user equipment from a first layer different from an IP layer of the eNB in the IP layer, checking whether or not the data packet corresponds to a data packet transmitted by the first layer using a header of the data packet, if the data packet corresponds to the data packet transmitted by the first layer, adding an IP header selected using a pre-stored mapping table to the data packet, delivering the data packet to which the IP header is added to a second layer corresponding to a lower layer, and transmitting the data packet to which the IP header is added to the network entity.

10 Claims, 10 Drawing Sheets

METHOD OF TRANSMITTING AND RECEIVING DATA USING NEW LAYER IN WIRELESS COMMUNICATION SYSTEM

CROSS REFERENCE TO RELATED APPLICATIONS

This application claims the benefit of the U.S. Provisional Patent Application No. 62/187,269, filed on Jul. 1, 2015, which is hereby incorporated by reference as if fully set forth herein.

BACKGROUND OF THE INVENTION

Field of the Invention

The present invention relates to a wireless communication system, and more particularly, to a method of performing data transmission and reception by designing a new layer in an eNB and an apparatus therefor.

Discussion of the Related Art

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system.

SUMMARY OF THE INVENTION

Accordingly, the present invention is directed to an apparatus and method thereof that substantially obviate one or more problems due to limitations and disadvantages of the related art.

An object of the present invention is to minimize power consumption of a user equipment by designing a new layer in the user equipment and an eNB in a mobile communication system such as 3GPP EPS (evolved packet system).

Another object of the present invention is to prevent other network entities from being affected by operations of a user equipment and an eNB while improving the operations of the user equipment and the eNB in consideration of characteristics of SDT (small data transmission).

Technical tasks obtainable from the present invention are non-limited the above mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of transmitting data, which is received from a user equipment and transmitted to a network entity by an eNB, includes the steps of receiving a data packet of the user equipment from a first layer different from an IP layer of the eNB in the IP layer, checking whether or not the data packet corresponds to a data packet transmitted by the first layer using a header of the data packet, if the data packet corresponds to the data packet transmitted by the first layer, adding an IP header selected using a pre-stored mapping table to the data packet, delivering the data packet to which the IP header is added to a second layer corresponding to a lower layer, and transmitting the data packet to which the IP header is added to the network entity.

The first layer may correspond to a new L3 layer corresponding to a higher layer of a PDCP (Packet Data Convergence Protocol) layer, the second layer may correspond to a GTP-U (General packet radio service Tunneling Protocol-U) layer, and the network entity may correspond to an S-GW (Serving Gateway).

The mapping table can be stored in a manner of matching an ID of a UE, an IP address of a UE, and a destination IP address with each other.

If a plurality of destinations are matched with a single UE, a plurality of the destinations can be identified by an identifier or an index.

The method can further includes the steps of receiving a data packet rather than the data packet transmitted by the first layer and delivering the data packet rather than the data packet transmitted by the first layer to the second layer without adding the IP header.

The data packet received from the first layer may not include IP information since the data packet does not undergo an IP layer of the user equipment.

To further achieve these objects and other advantages and in accordance with the purpose of the invention, as embodied and broadly described herein, according to a different embodiment, an eNB can include a transmission unit, a reception unit, and a processor configured to operate in a manner of being connected with the transmission unit and the reception unit, the processor configured to receive a data packet of the user equipment from a first layer different from an IP layer of the eNB in the IP layer, the processor configured to check whether or not the data packet corresponds to a data packet transmitted by the first layer using a header of the data packet, the processor, if the data packet corresponds to the data packet transmitted by the first layer, configured to add an IP header selected using a pre-stored mapping table to the data packet, the processor configured to deliver the data packet to which the IP header is added to a second layer corresponding to a lower layer, the processor configured to transmit the data packet to which the IP header is added to the network entity.

It is to be understood that both the foregoing general description and the following detailed description of the present invention are exemplary and explanatory and are intended to provide further explanation of the invention as claimed.

Advantageous Effects

According to embodiments of the present invention, it may be able to expect advantageous effects described in the following.

First of all, it is able to improve power consumption and resource consumption in a manner of omitting a process of an IP layer from a user equipment.

Secondly, it is able to minimize implementation burden since there is no impact that affects other network entities except an eNB and a user equipment.

Effects obtainable from the present invention may be non-limited by the above mentioned effect. And, other unmentioned effects can be clearly derived and understood from the following description by those having ordinary skill in the technical field to which the present invention pertains. Moreover, the present invention may have an unexpected advantage while those skilled in the art implement the present invention based on the following description.

BRIEF DESCRIPTION OF THE DRAWINGS

The accompanying drawings, which are included to provide a further understanding of the invention, provide embodiments of the present invention together with detailed explanation. A technical characteristic of the present invention may be non-limited by a specific drawing. A new embodiment can be configured by combining characteristics disclosed in each drawing with each other. Reference numerals in each drawing mean structural elements.

DETAILED DESCRIPTION OF THE INVENTION

Figure 1:
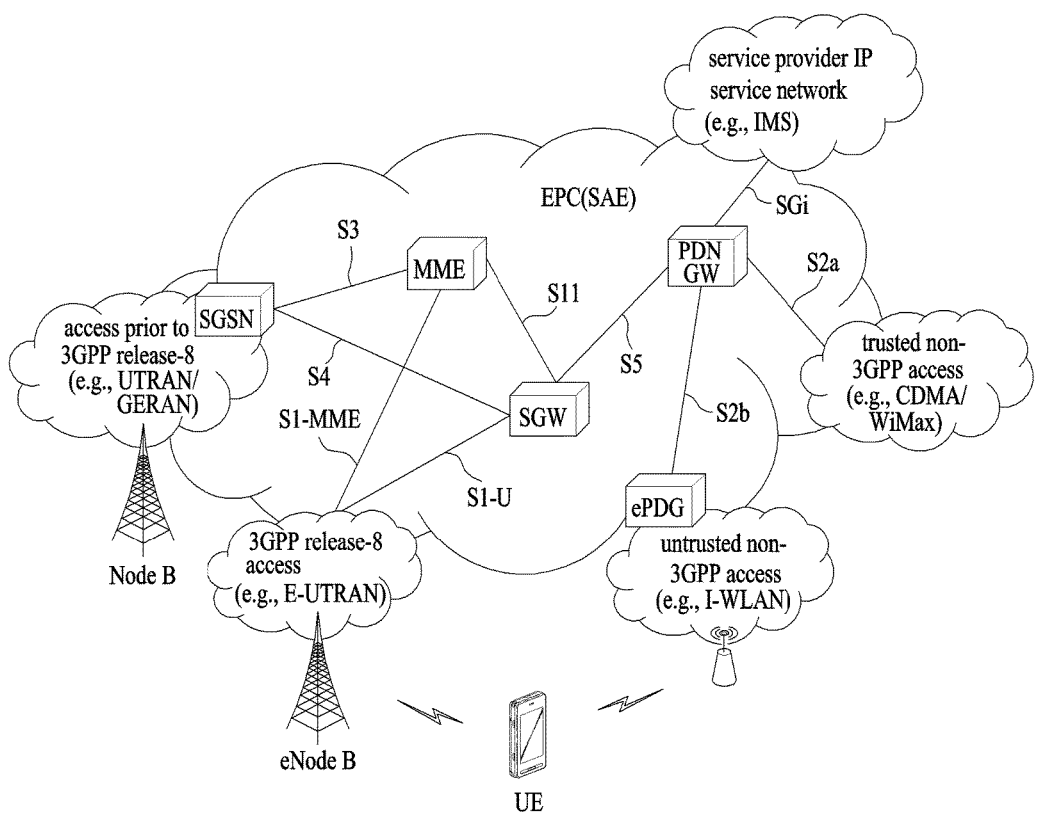
FIG. 1 is a diagram for a schematic structure of an EPS (evolved packet system) including an EPC (evolved packet core)

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used for the embodiments of the present invention are provided to help in understanding of the present invention. These specific terms may be replaced with other terms within the scope and spirit of the present invention.

In some instances, to prevent the concept of the present invention from being ambiguous, structures and apparatuses of the known art will be omitted, or will be shown in block diagram form based on main functions of each structure and apparatus. In addition, wherever possible, like reference numerals denote the same parts throughout the drawings and the specification.

The embodiments of the present invention can be supported by standard documents disclosed for at least one of wireless access systems including Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by these specifications. Further, all terms as set forth herein can be explained by the standard specifications.

Techniques described herein can be used in various wireless access systems. For clarity, the present disclosure focuses on 3GPP LTE and LTE-A systems. However, the technical features of the present invention are not limited thereto.

Terms used in the following description are defined as follows.

UMTS (Universal Mobile Telecommunication System): 3rd generation mobile communication technology based on a Global System for Mobile Communication (GSM) developed by 3GPP.

EPS (Evolved Packet System): Network system including an Evolved Packet Core (EPC) which is a Packet Switched (PS) core network based on Internet Protocol (IP) and an access network such as LTE/UTRAN, which is evolved from UMTS.

NodeB: Base station of a GERAN/UTRAN, which is installed outdoors and has a coverage corresponding to a macro cell.

eNodeB: Base station of E-UTRAN, which is installed outdoors and has a coverage corresponding to a macro cell.

UE (User Equipment): UE can also be referred to as a terminal, a Mobile Equipment (ME), a Mobile Station (MS) or the like. In addition, the UE can be a portable device such as a laptop computer, a mobile phone, a Personal Digital Assistant (PDA), a smartphone or a multimedia device, or a non-portable device such as a Personal Computer (PC) or a vehicle-mounted device. In MTC, the term "UE" or "terminal" may refer to an MTC device.

HNB (Home NodeB): Base station of a UMTS network, which is installed outdoors and has a coverage corresponding to a macro cell.

HeNB: Base station of an EPS network, which is installed outdoors and has a coverage corresponding to a macro cell.

MME (Mobility Management Entity): Network node of an EPS network, which performs Mobility Management (MM) and Session Management (SM).

PDN-GW (Packet Data Network-Gateway)/P-GW: Network node of an EPS network, which performs UE IP address allocation, packet screening and filtering, charging data collection, etc.

SGW (Serving Gateway): Network node of an EPS network, which performs mobility anchoring, packet routing, idle mode packet buffering, a function of triggering an MME to page a UE, etc.

PCRF (Policy and Charging Rule Function): a network node of an EPS network performing policy decision to dynamically apply QoS and a charging policy differentiated according to a service flow OMA DM (Open Mobile Alliance Device Management): a protocol designed to manage a mobile device such as a cellular phone, a PDA, a mobile computer and the like. This protocol performs such a function as device configuration, firmware upgrade, error report and the like.

OAM (Operation Administration and Maintenance): a network management functional group for providing network flaw display, performance information, and data and diagnosis function.

NAS (Non-Access Stream): a higher stratum of a control plane between UE and MME. The NAS corresponds to a functional layer for transceiving signaling and traffic message between a UE and a core network in LTE/UMTS protocol stack. The NAS supports mobility of a UE, a session management procedure for establishing and managing IP connection between a UE and a PDN GW, and IP address management, etc.

AS (Access-Stratum): includes a protocol stack between a UE and a radio (or access) network and plays a role in transmitting data, network control signal, and the like.

NAS configuration MO (Management Object): MO (Management Object) used in a procedure for setting parameters related to NAS functionality to a UE.

PDN (Packet Data Network): Network at which a server supporting a specific service (e.g., MMS (Multimedia Messaging Service) server, WAP (Wireless Application Protocol) server, etc.) is located.

PDN connection: logical connection between a UE and a PDN, represented by a single IP address (single IPv4 address and/or single IPv6 prefix).

APN (Access Point Name): character string for indicating or identifying a PDN. In order to access a requested service or a network, it is necessary to undergo a specific P-GW. In this case, the APN corresponds to a name (character string) predefined in a network to discover the specific P-GW. (e.g., internet.mnc012.mcc345.gprs)

RAN (Radio Access Network): a unit including Node B, eNode B, and RNC (Radio Network Controller) for controlling the Node B and the eNode B in 3GPP network. The RAN exists between UEs and provides connection to a core network.

HLR (Home Location Register)/HSS (Home Subscriber Server): Database including subscriber information in 3GPP network. The HSS can perform such a function as configuration storage, identity management, user status storage and the like.

PLMN (Public Land Mobile Network): Network configured to provide a mobile communication service to individuals. The PLMN can be configured in a manner of being separated according to an operator.

ANDSF (Access Network Discovery and Selection Function): As a network entity, the ANDSF can provide a policy for enabling a UE to discover and select access capable of being used by the UE in a unit of a service provider.

1. EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
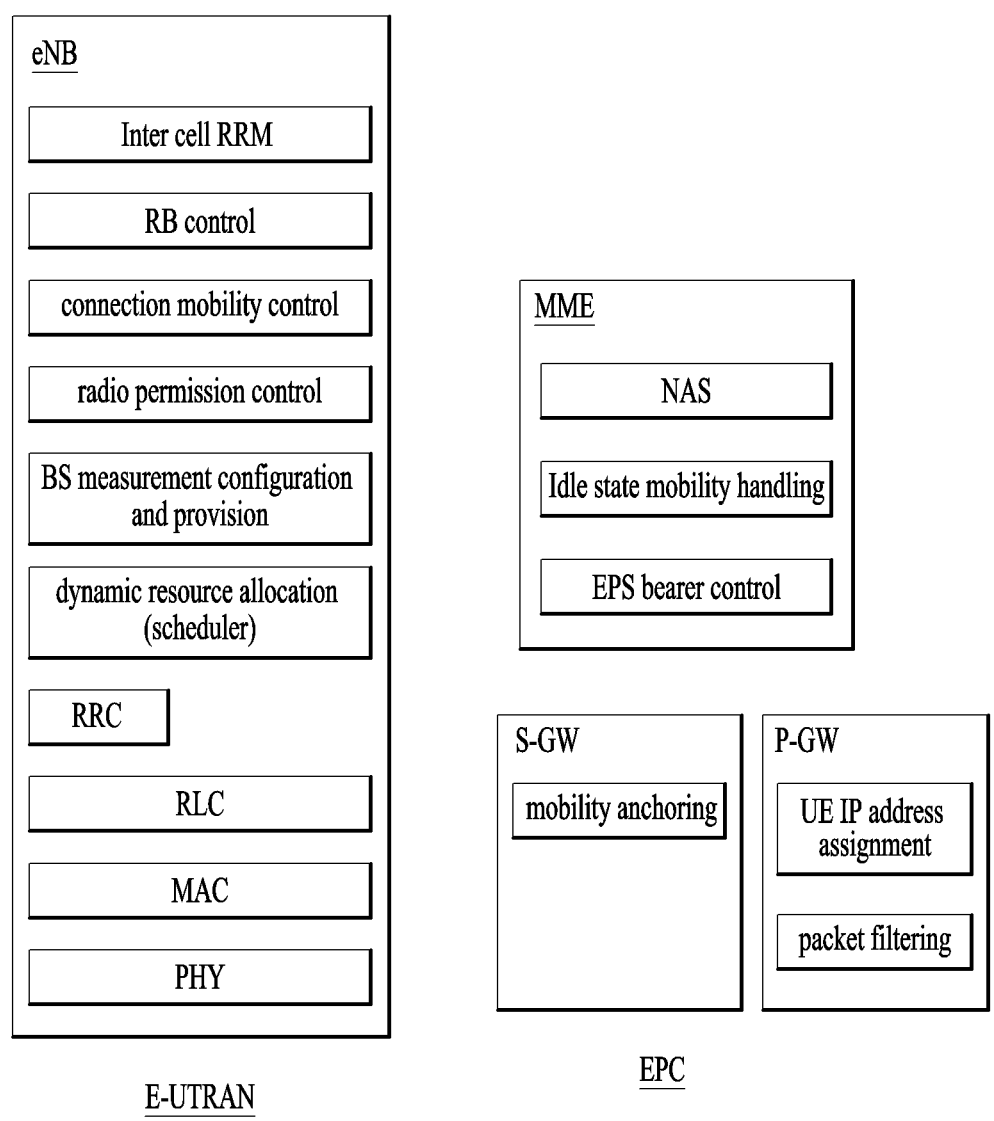
FIG. 2 is a diagram for an example of a general architecture of E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE IDLE state management, ciphering of the user plane, SAE bearer control, and ciphering and integrity protection of NAS signaling.

Figure 3:
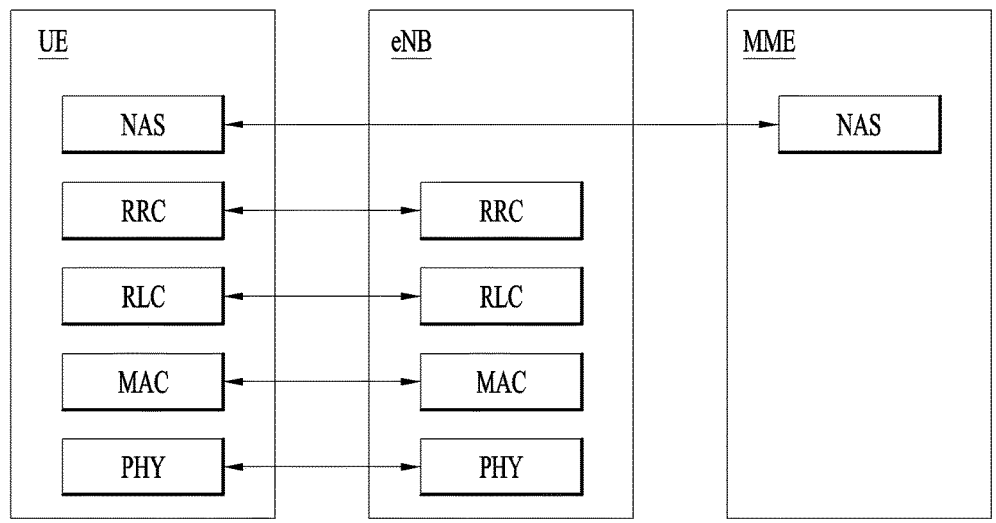
FIG. 3 is a diagram for an example of a wireless interface protocol in a control plane.
Figure 4:
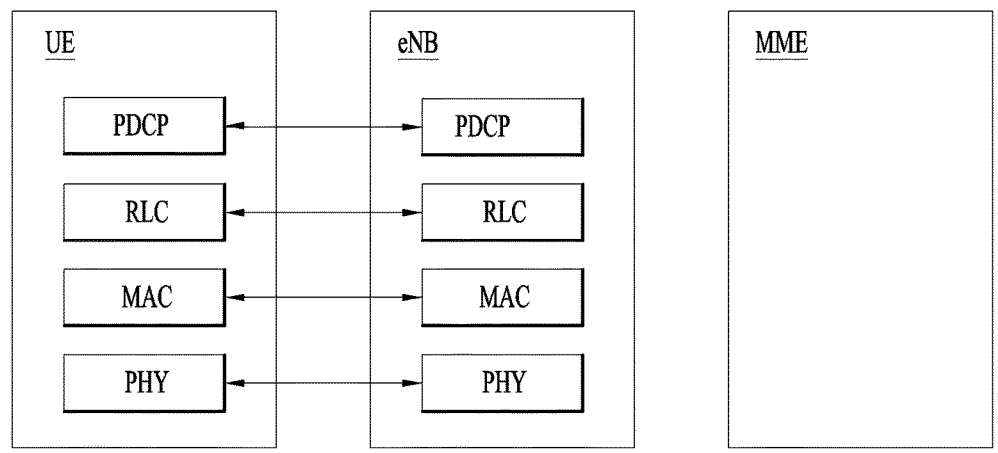
FIG. 4 is a diagram for an example of a wireless interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
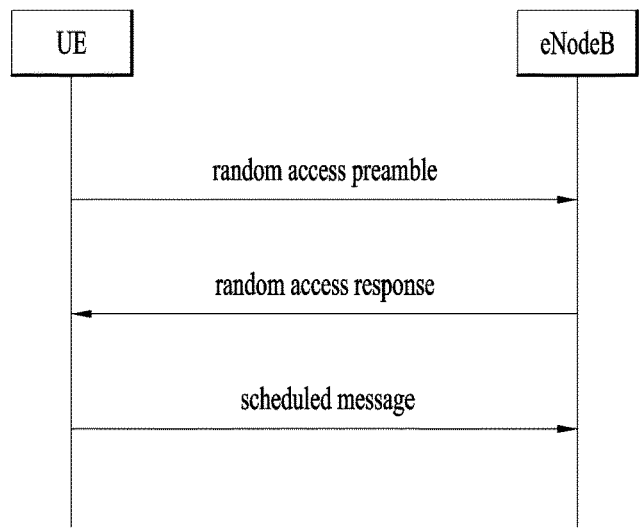
FIG. 5 is a flowchart for explaining a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
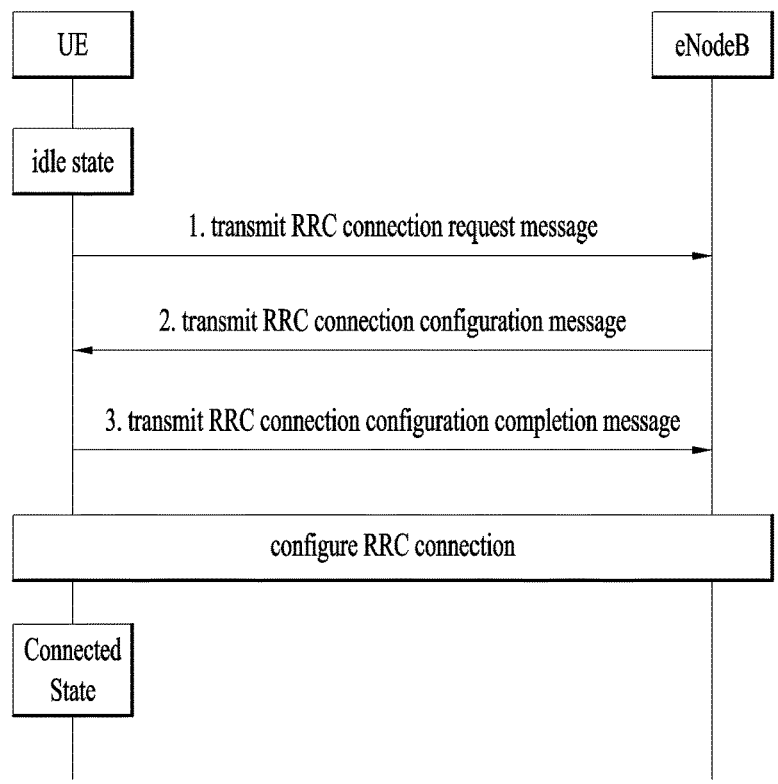
FIG. 6 is a flowchart for a connection procedure in an RRC (radio resource control) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNodeB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

2. Method of Transmitting and Receiving Data Using New Layer

Figure 7:
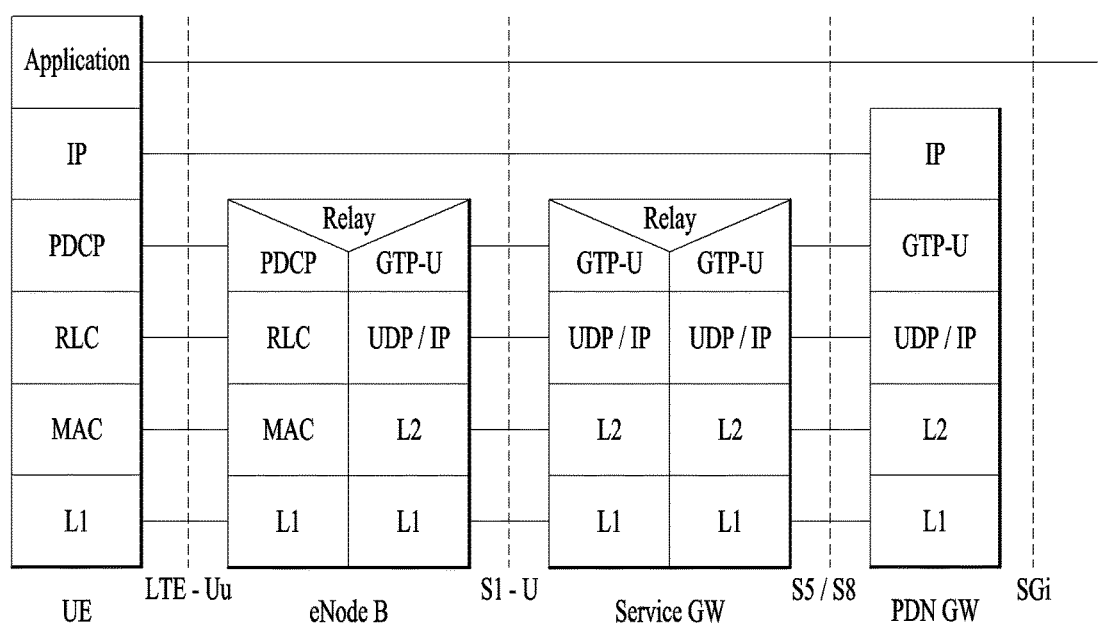
FIG. 7 is a diagram for a legacy user plane protocol stack.

FIG. 7 is a diagram for a legacy user plane protocol stack.

In a legacy EPS system, all terminals (or UEs) perform a predetermined identical procedure to transmit and receive MO (mobile originated) data and MT (mobile terminated) data. And, an enhancement work for SDT (short data transmission) is focusing on reducing signaling of a procedure performed by each of MTC (machine type communication) UEs.

Meanwhile, a traffic size of a plurality of ultra low complexity UEs targeted by current cellular IoT (CIoT) is relatively very small. In particular, in case of MAR (Mobile Autonomous Reporting), i.e., in case of a model that a UE autonomously performs sensing and periodically reports a sensed data, the model follows a Pareto distribution that a minimum size of data corresponds to 20 bytes. According to the model, about 90% of data has a size equal to or less than 50 bytes.

As mentioned in the foregoing description, as a size of actually transmitted data (i.e., payload) is getting smaller, a ratio of a header added to data becomes relatively bigger. For example, a minimum header size of IPv6 is 40 bytes. A ratio of an IP packet to a header may become about 50% or higher depending on a size of a payload. In terms of a network, since a resource is consumed for data rather than meaningful payload data, it is inefficient. And, in terms of a UE, in order to deliver overhead of a size as big as a size of actually required data, power and resources are consumed for the delivery.

And, as shown in FIG. 7, an IP header is not necessary for an AS section between a UE and an eNB. Yet, a resource for delivering an IP header is consumed. This becomes big overhead in terms of characteristic of SDT.

Meanwhile, in various scenarios including CIoT and the like, it is able to assume environment at which a plurality of ultra-low complexity MTC UEs exist. Characteristics of a ultra-low complexity UE may include an operation of a very limitative purpose (e.g., periodic reporting of a sensed value), SDT of a size of dozens of bytes and a very small bandwidth, occurrence of MO data with a long interval, low mobility, a limited destination, and the like. And, assume that a UE uses a default bearer only and supports very simple QoS only. And, a UDP (User Datagram Protocol) or a UDP with Acknowledgement scheme is used in a transport layer.

Due to the characteristic of an ultra-low complexity MTC UE mainly targeting the SDT, it may be inefficient to follow the legacy EPS system procedure. Hence, it is necessary to have a new procedure in consideration of environment of the MTC UE that mobility is restricted and a destination is also restricted.

Figures 8, 9:
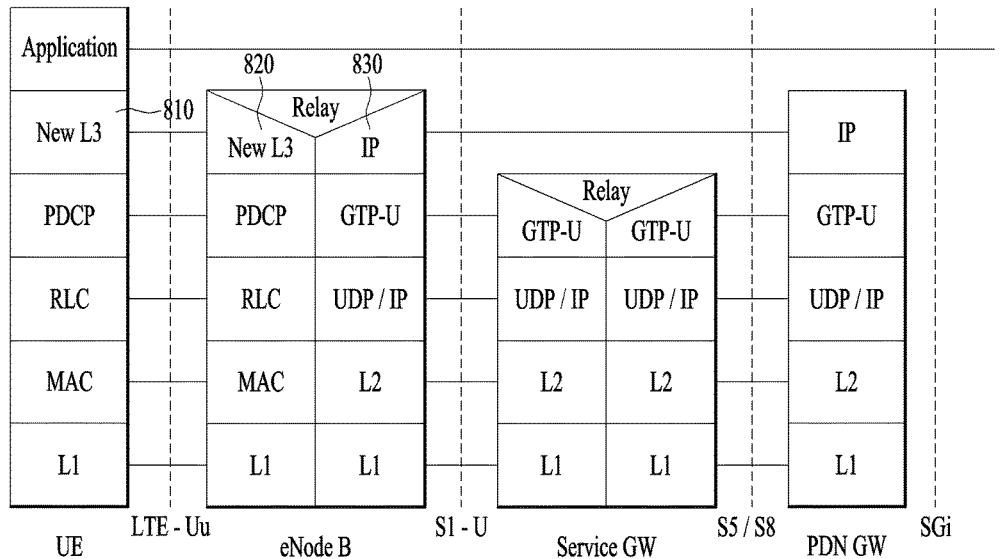
FIG. 8 is a diagram for a user plane protocol stack according to a proposed embodiment.
FIG. 9 is a diagram for a mapping table according to a proposed embodiment.

FIG. 8 is a diagram for a user plane protocol stack according to a proposed embodiment and FIG. 9 is a diagram for a mapping table according to a proposed embodiment.

An object of a proposed embodiment is to enhance a data transmission procedure in a user plane. In particular, the embodiment proposes to separate an IP layer among overhead layers from a UE and proposes a new L3 layer to be in charge of a function of the L3 layer in the UE.

First of all, an IP layer operation in an eNB according to the proposed embodiment is explained in the following. As mentioned earlier in FIG. 7, according to a legacy user plane protocol stack, PDU transmission of an IP layer is managed by a PDCP layer in an AS section and a GTP-U (General packet radio service Tunneling Protocol-U) layer in an S1-U section, respectively. On the contrary, according to an embodiment proposed in FIG. 8, a new IP layer (or, an IP agent) 830 is added to the top of the GTP-U layer for a legacy S1-U interface in an eNB. And, a new L3 layer 810 is added between a PDCP layer and an application layer of a UE and a new L3 layer 820 is added to the top of a PDCP layer of the eNB. The new L3 layer shall be described later. First of all, the new IP layer 830 added to the eNB is explained in the following.

An eNB manages IP addresses of UEs managed by the eNB. It may be able to implement the eNB to store the IP addresses of the UEs in a form of a mapping table shown in FIG. 9. The mapping table shown in FIG. 9 stores a UE ID 910 for identifying each of the UEs, a UE IP address 920 of each of the UEs, and pre-configured IP header information 930 by mapping the UE ID, the UE IP and the IP header information with each other.

The UE ID for identifying UEs can be generated in a new form and a previously used network identifier (e.g., S-TMSI (System Architecture Evolution-Temporary Mobile Subscriber Identity)) of a UE can be used as well. The pre-configured IP header information corresponds to information required for generating such an IP header as a PDN type of a UE, a destination address, and the like.

IP header information corresponds to information including a PDN type of a UE, a destination address, information on whether or not a plurality of destinations are configured and the like. If a plurality of destination addresses are requested to a UE, flags indicating a plurality of the destination addresses and identifiers (indexes) for a plurality of destinations can be stored together in an IP header 940.

As mentioned in the foregoing description, in environment that a UE transmits data to a limited destination address only, a new IP layer of an eNB stores and manages a destination address specified in the UE. The destination address can be stored in user information (e.g., user information stored in HSS) or can be configured in advance via an attach procedure, an EMM (EPS Mobility Management) procedure such as TAU (Tracking Area Update) or RAU (Routing Area Update), a PDN connection procedure, a bearer activation procedure, an ESM (EPS Session management) procedure such as bearer resource modification, etc.

If an IP address is assigned via the attach procedure, an eNB adds an IP address of a UE to the mapping table shown in FIG. 9. In particular, an IP layer of the eNB is seen as an IP layer of the UE from the outside. Subsequently, a packet (i.e., MT data) transmitted to the UE is also delivered to the eNB managing the UE on the basis of an IP address of the UE. An IP packet delivered from a GTP-U layer is decoded in an IP layer of the eNB. The IP layer of the eNB compares a destination IP of an MT data packet with a pre-stored mapping table and checks a UE for which the data packet is to be used. Subsequently, the IP layer of the eNB specifies an ID of a UE according to the mapping table and delivers an IP PDU to the UE. In this case, the IP layer of the eNB encapsulates the IP PDU using a header of a new L3 layer, which is described later, while an IP header is excluded.

In the aforementioned environment, the MT data packet may correspond to a confirmation response (acknowledgement) in response to an MO packet transmitted by the UE, triggering for the UE, or a control signal. Hence, the IP layer of the eNB can transmit MT data, which is received from a pre-stored IP address, to the UE only. In this case, it may be able to apply a procedure of filtering the MT data in a manner of comparing a source IP of the MT data and a destination IP stored by the UE with each other.

On the contrary, when the UE transmits an MO packet, the UE delivers L4 or an application PDU to a new L3 layer. Having received the MO packet, if it is checked that the MO packet corresponds to an SDT packet, the new L3 layer of the eNB delivers the MO packet to an IP layer of an S1-U section. The IP layer of the eNB identifies IP header information corresponding to an ID of the UE with reference to the mapping table shown in FIG. 9, adds an IP header indicating a destination address of the MO data to a PDU, and delivers the PDU to a GTP-U layer.

In the following, operations 810/820 of a new L3 layer, which is added to a UE and an eNB, are explained. As mentioned in the foregoing description, a new L3 layer 810 is added between a PDCP layer of the UE and an application layer and a new L3 layer 820 is added to the top of a PDCP layer of the eNB. Instead of eliminating an IP layer used to operate between a legacy application layer and a PDCP layer, the new L3 layer is added to control an operation between the two layers and an operation between the UE and the eNB.

In case of the UE, the new L3 layer adds an L3 header to a PDU, which is received from a higher layer (application layer), and delivers the PDU to a PDCP layer. The L3 header may include information indicating that a corresponding packet is transmitted by the new L3 layer. If a plurality of destinations are configured in advance, the L3 header can further include an indicator or an index for identifying a destination as well as the information indicating the L3 layer.

The new L3 layer of the eNB operates by interpreting a PDU received from the PDCP layer or the IP layer of the eNB. Specifically, the new L3 layer of the eNB checks a header of a PDU received from the UE. If an MO packet corresponds to a legacy IP packet, the new L3 layer of the eNB delivers the MO packet to GTP-U of an S-GW. On the contrary, if the MO packet corresponds to a packet of the new L3 layer, the new L3 layer of the eNB delivers the MO packet to the IP layer of the eNB. As mentioned in the foregoing description on the IP layer, an IP header is added to the MO packet, which is delivered to the IP layer of the eNB, and the MO packet is delivered to the GTP-U layer of the S1-U section.

On the contrary, if an MT packet is transmitted to the UE, an SDU is delivered to the new L3 layer of the eNB via a procedure that the MT packet is matched with a mapping table by the IP layer of the eNB. The new L3 layer of the eNB generates an L3 header and delivers the generated L3 header to a PDCP layer corresponding to a lower layer. If a plurality of destination addresses are set to a corresponding packet, an indicator or an index for identifying a specific destination address is specified in the header.

Besides the aforementioned embodiments, an embodiment of additionally simplifying a transport layer is explained in the following. Basically, since the transport layer uses a datagram scheme, the embodiment proposes to delete a function of the transport layer in a UE in environment that an operation of the UE is restricted (e.g., single port exists only). By doing so, an SDU of a new L3 layer can be directly delivered to an application layer according to an implementation of an operating system of the UE. In this case, a destination port can be stored in a form of a destination address shown in the mapping table of FIG. 9. As mentioned in the above, if the UE uses limited number of ports, a port number can be specified together in a UE IP address 920 item of the mapping table.

Unlikely, if an eNB manages many ultra-low complexity UEs and a UE requires a single port only to simply perform a single communication operation only, an IP layer of each eNB may operate as a sinc node of a wireless sensor network. In this case, each UE does not have a unique IP address. Instead, UEs of a group unit have a single IP address. A UE group can be formed by UEs including a same destination address or can be configured on the basis of various other references. In this case, the IP layer of the eNB manages an IP address of each UE group and information on UEs belonging to each UE group. In this case, UEs are distinguished from each other using a unique ID 910 of a UE shown in FIG. 9. In terms of an external network, each of the UEs is identified by a port.

Figure 10:
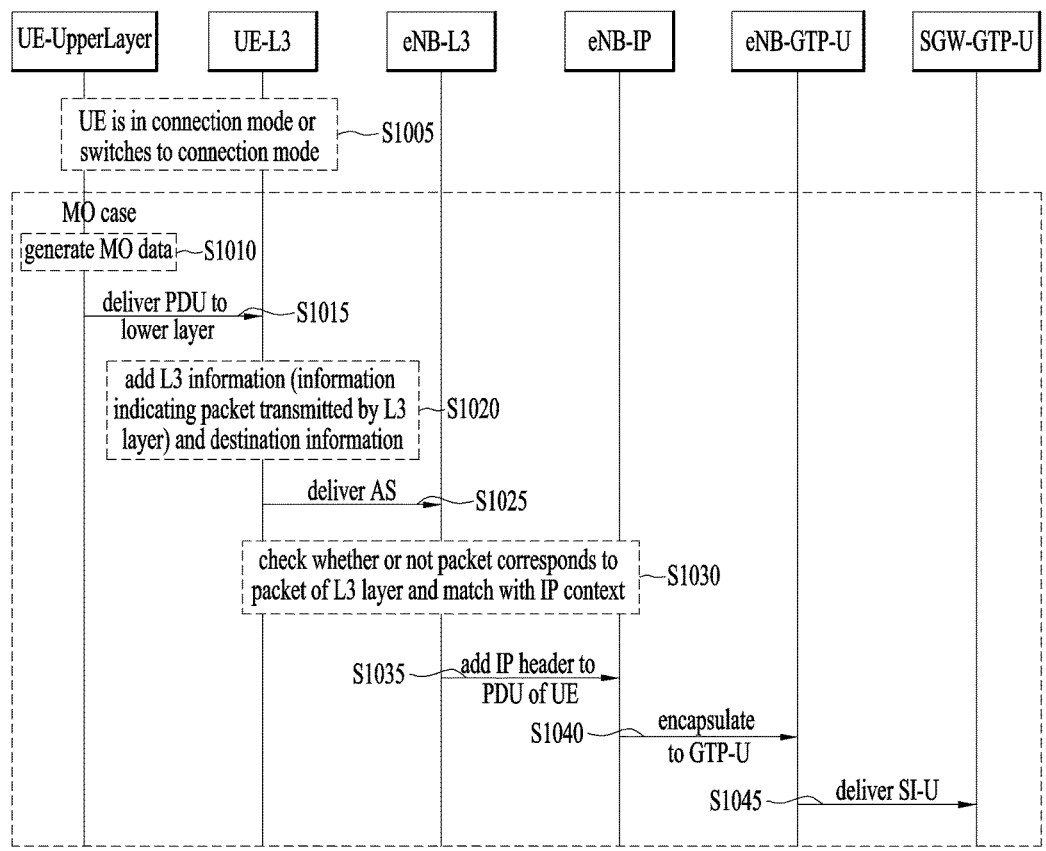
FIGS. 10 and 11 are flowcharts for a procedure of transmitting MO (mobile originated) data and MT (mobile terminated) data according to a proposed embodiment.
Figure 11:
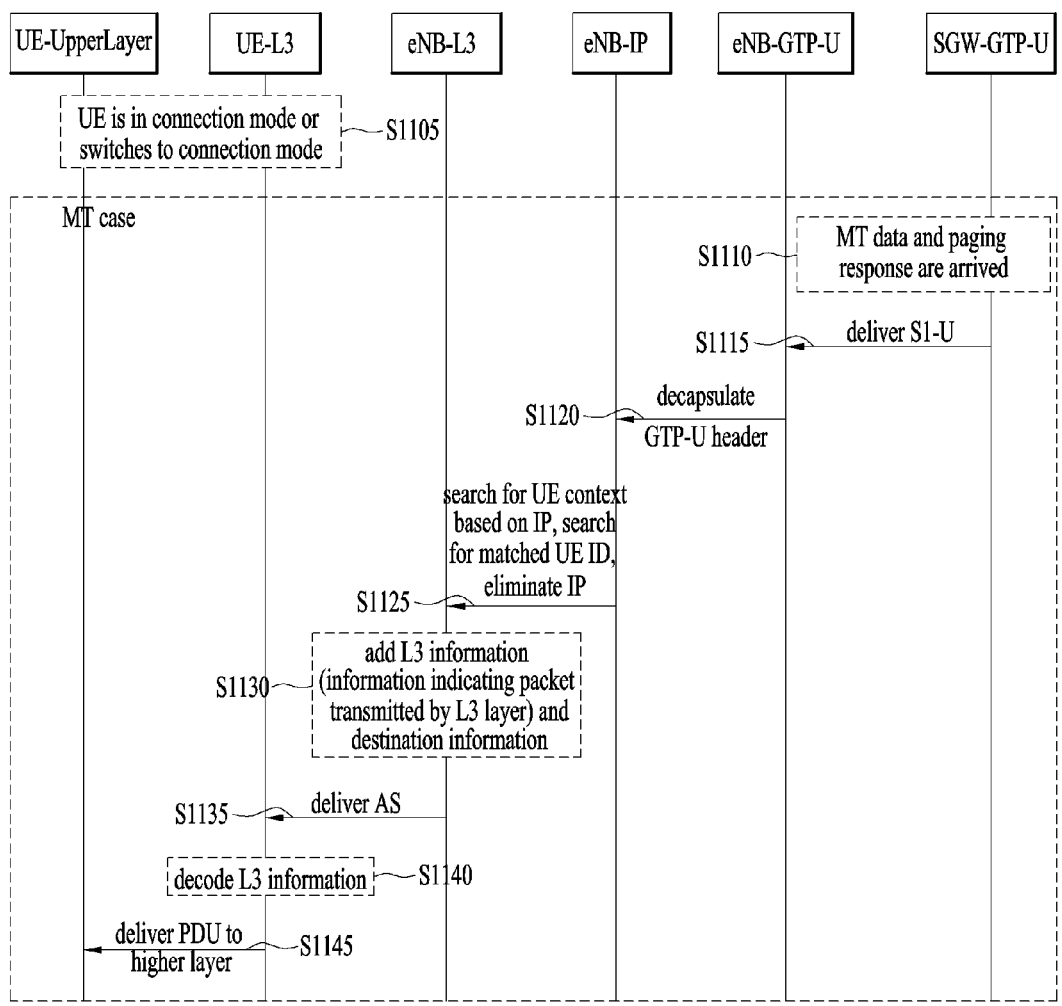

FIGS. 10 and 11 are flowcharts for a procedure of transmitting MO (mobile originated) data and MT (mobile terminated) data according to a proposed embodiment. FIGS. 10 and 11 show a procedure of transmitting and receiving data in case that a new L3 layer and a new IP layer are added to a UE and an eNB according to the aforementioned embodiment. FIG. 10 and FIG. 11 show a procedure of transmitting and receiving MO data and a procedure of transmitting and receiving MT data, respectively.

FIG. 10 is explained first. A UE is in a connection mode or is in a state of switching to a connection mode via a service request [S1005]. As mentioned earlier in FIG. 9, an eNB includes information on an IP header as context information of the UE. The information on the IP header can include a PDN connection type, a destination address, and information on whether or not a plurality of destinations are configured.

MO data is generated in a higher layer (application layer and/or transport layer) of the UE [S1010] and the generated MO data is delivered to a new L3 layer corresponding to a lower layer [S1015]. Unlike a legacy IP layer, the L3 layer of the UE adds L3 information and destination information to a data packet [S1200]. In this case, the L3 information can indicate that an MO data packet uses the new L3 layer. The destination information can be added to the data packet when a plurality of destinations are used. As mentioned in the foregoing description, the destination information can be included in an L3 header when a plurality of destinations are configured. In this case, when a plurality of destinations are set to the UE, the destination information can include an indicator or an index to identify a destination.

A PDU is delivered to the eNB together with the L3 information [S1025]. In this procedure, a legacy PDCP layer can be used as a lower layer of the L3. In this case, header compression may not be applied.

Having received the MO data, the L3 layer of the eNB determines whether a received packet corresponds to a packet of a legacy IP layer or a packet of the new L3 layer [S1030]. This procedure can be performed according to whether or not the L3 information is included in the MO data packet. If a packet corresponds to a packet transmitted by a general IP layer, the eNB can deliver the packet to GTP-U layer of S1-U section without any additional operation.

Yet, if the L3 information is detected and it is checked that the MO data corresponds to a packet transmitted by the L3 layer, the eNB delivers the MO data to the IP layer. Subsequently, the IP layer of the eNB checks IP header information matched with a source IP address of the UE, which has transmitted the MO data. This procedure can be performed with reference to a mapping table. The eNB generates IP header information matched with the UE, which has transmitted the MO data, and adds the IP header information to the PDU [S1035].

Subsequently, the IP layer of the eNB delivers an IP packet to which an IP header is added to the GTP-U layer of the S1-U section in a manner of encapsulating the IP packet [S1040] and the GTP-U layer delivers the MO data to an S-GW via GTP tunneling [S1045].

In the following, FIG. 11 is explained. Similar to FIG. 10, a UE is in a connection mode or is in a state of switching to a connection mode via a response in response to paging [S1105]. If MT data is arrived at an S-GW [S1110], the S-GW delivers an MT packet to an eNB via an S1-U section [S1115]. A GTP-U layer of the eNB decapsulates a GTP-U header [S1120] and delivers the decapsulated GTP-U header to an IP layer.

The IP layer of the eNB checks context information of the UE possessed by the eNB based on a destination IP address of the MT data. In particular, the IP layer of the eNB checks a UE to which the MT data is to be transmitted. This procedure can be performed using a mapping table stored in the eNB in advance. If a UE matched with a destination IP address is searched, the IP layer of the eNB eliminate an IP header and delivers a PDU to an L3 layer [S1125].

The L3 layer of the eNB adds L3 information (information indicating that a packet is transmitted from the L3 layer) and destination information to the PDU to transmit the MT data to the UE [S1130] and transmits a packet to the UE via an AS section [S1135]. Having received the MO data packet, the UE decodes the L3 information [S1140] and delivers the PDU to a higher layer [S1145]. If the UE has a plurality of destinations, the UE can deliver the PDU to a precise higher layer using an indicator or an index indicating a specific destination address.

Figure 12:
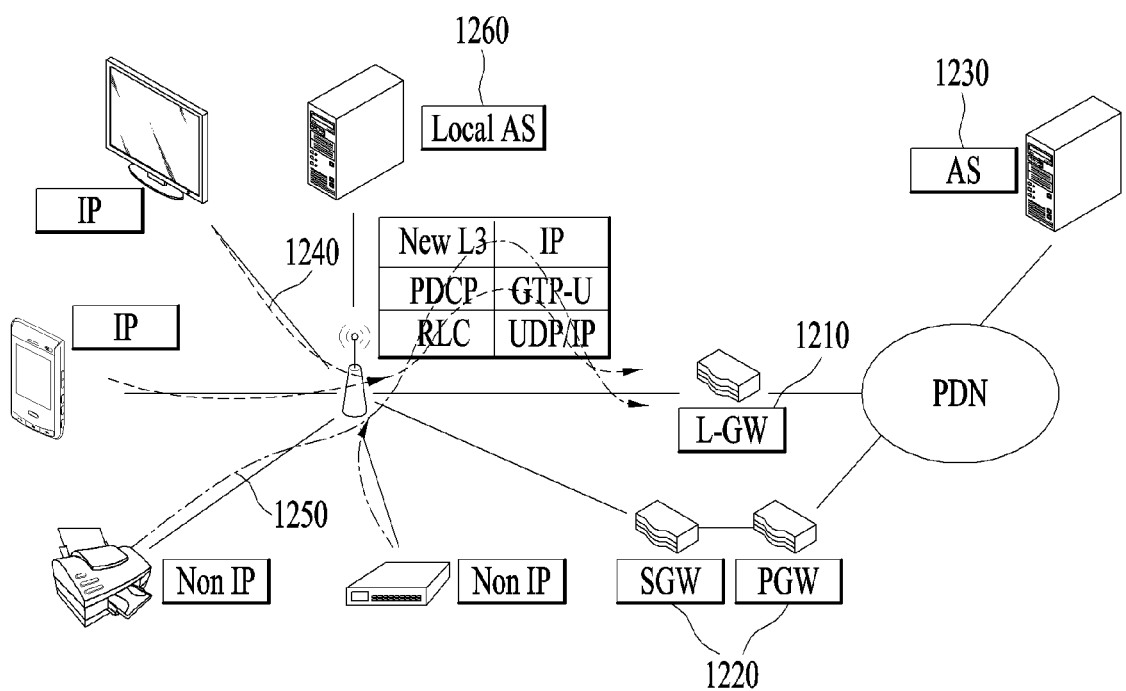
FIG. 12 is a diagram for a system architecture related to a proposed embodiment.

According to the aforementioned embodiments, an IP layer operation of ultra-low complexity MTC UEs is omitted (i.e., headerless IP transmission). Hence, a size of data transmitted by the UE is reduced and network complexity can be reduced. Since the UE does not perform an IP-related operation, power consumption can also be reduced. Meanwhile, the IP layer operation omitted from the UE is performed by the eNB. In FIG. 12, effectiveness of the aforementioned structure is explained.

FIG. 12 is a diagram for a system architecture related to a proposed embodiment. Not only a UE supporting an IP but also a non-IP UE (e.g., low complexity UEs not including Zigbee or IP layer) not supporting an IP may exist in a single eNB. In case of a heterogeneous network that the IP UE and the non-IP UE exist in the eNB, it may be difficult to configure a local network. And, for a LIPA (Local IP Access) technology, it is necessary to have an L-GW (Local Gateway) connected with an eNB or co-located with the eNB and an additional resource.

In this situation, in case of adding an IP layer to an eNB according to the proposed embodiment, it may be able to have merits in terms of two points. First of all, end-to-end (E2E) delay can be reduced using a local application server. According to the related art, an IP anchor point exists in an L-GW in case of applying P-GW or LIPA. The anchor point plays a role in assigning an IP and routing an IP. In order to perform routing to a specific application server 1220, it is mandatory to have a path 1220 passing through S-GW and P-W and a path 1210 passing through L-GW. E2E delay occurred due to the path may become a big burden depending on a type of an application.

On the contrary, according to the proposed embodiment, similar to the legacy scheme, IP assignment is performed by a P-GW or an L-W. Yet, since an IP layer added to an eNB is able to read IP-related information, IP routing can be performed by the eNB. In particular, as described in the following, routing can be performed not only for a packet of an IP UE but also for a packet of a non-IP UE 1250. Hence, a plurality of local application servers possessed by a network service provider can be deployed at an edge stratum 1260. This scenario is one of scenarios currently discussed on 5G architecture.

In particular, in such a situation as V2X (Vehicle to Everything) that E2E delay is fatal, if an eNB is able to directly route an IP to a local application server, it may be able to considerably reduce the E2E delay. And, when a CDN (content distribution network) or caching storage is deployed at an edge stratum, local routing using the IP layer of the eNB can also be applied.

Secondly, it is able to configure a local network without L-GW. According to LIPA technology, it is impossible to configure an IP UE and a non-IP UE as a single local network. Yet, if an IP layer is added to an eNB according to the proposed embodiment, it may be able to configure a heterogeneous network in which an IP UE and a non-IP UE coexist. For example, a PC corresponding to an IP UE can communicate with a printer corresponding to a non-IP UE using a local network.

3. Device Configuration

Figure 13:
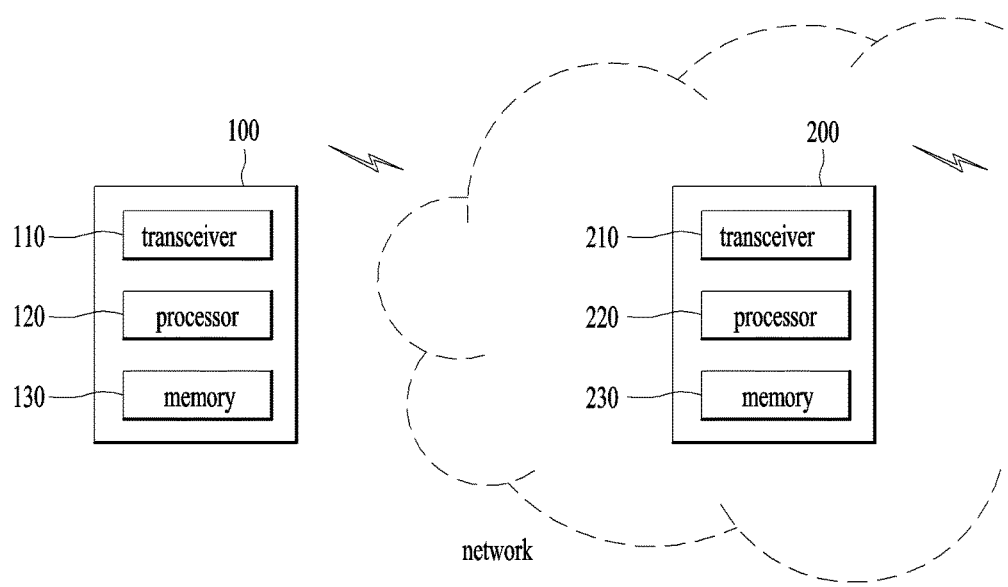
FIG. 13 is a diagram for a configuration of a node device according to a proposed embodiment.

FIG. 13 is a diagram for a configuration of a node device according to a proposed embodiment.

A user equipment 100 can include a transceiver 110, a processor 120 and a memory 130. The transceiver can be configured to transmit various signals, data and information to an external device and receive various signals, data and information from an external device. The transceiver 110 can be implemented in a manner of being divided into a transmitter and a receiver. The user equipment 100 can be connected with an external device in wired and/or in wireless. The processor 120 can control overall operation of the user equipment 100 and the processor can be configured to perform a function of calculating information and the like to be transceived with an external device by the user equipment 100. And, the processor 120 can be configured to perform a UE operation proposed in the present invention. The memory 130 can store calculated information and the like for a prescribed time and can be replaced with a configuration element such as a buffer (not depicted) or the like.

Referring to FIG. 13, a network node 200 according to a proposed embodiment can include a transceiver 210, a processor 220 and a memory 230. The transceiver 210 can be configured to transmit various signals, data and information to an external device and receive various signals, data and information from an external device. The network node 200 can be connected with an external device in wired and/or in wireless. The transceiver 210 can be implemented in a manner of being divided into a transmitter and a receiver. The processor 220 can control overall operation of the network node 200 and the processor can be configured to perform a function of calculating information and the like to be transceived with an external device by the network node 200. And, the processor 220 can be configured to perform a network node operation proposed in the present invention. The memory 230 can store calculated information and the like for a prescribed time and can be replaced with a configuration element such as a buffer (not depicted) or the like.

The configurations of the user equipment and the network node as described above may be implemented such that the above-described embodiments can be independently applied or two or more thereof can be simultaneously applied, and description of redundant parts is omitted for clarity.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

INDUSTRIAL APPLICABILITY

The method of transmitting and receiving data of an eNB can be applied not only to 3GPP system but also to various wireless communication systems including IEEE 802.16x, 802.11x system. Moreover, the proposed method can also be applied to mmWave communication system using a ultra-high frequency band.

What is claimed is:

1. A method of transmitting data, which is received from a user equipment and transmitted to a network entity by an eNB, comprising the steps of:
   receiving, by an IP layer of the eNB, a data packet of the user equipment (UE) from a first layer different from the IP layer;
   checking whether or not the data packet of the UE corresponds to a data packet transmitted by the first layer using a header of the data packet of the UE;
   adding an IP header selected using a pre-stored mapping table to the data packet of the UE, when the data packet of the UE corresponds to the data packet transmitted by the first layer;
   submitting the data packet to which the IP header is added to a second layer corresponding to a lower layer; and
   transmitting the data packet to which the IP header is added to the network entity,
   wherein the first layer corresponds to a new L3 layer corresponding to a higher layer of a PDCP (Packet Data Convergence Protocol) layer, wherein the second layer corresponds to a GTP-U (General packet radio service Tunneling Protocol-U) layer, and wherein the network entity corresponds to an S-GW (Serving Gateway).

2. The method of claim 1, wherein the mapping table is stored in a manner of matching an ID of a UE, an IP address of a UE, and a destination IP address with each other.

3. The method of claim 2, wherein if a plurality of destinations are matched with a single UE, a plurality of the destinations are identified by an identifier or an index.

4. The method of claim 1, further comprising the steps of:
   receiving a data packet rather than the data packet transmitted by the first layer; and
   submitting the data packet rather than the data packet transmitted by the first layer to the second layer without adding the IP header.

5. The method of claim 1, wherein the data packet received from the first layer does not comprise IP information since the data packet does not undergo an IP layer of the user equipment.

6. An eNB configured to transmit data received from a user equipment to a network entity, the eNB comprising:
   a transmission unit;
   a reception unit; and
   a processor configured to operate in a manner of being connected with the transmission unit and the reception unit, the processor configured to receive a data packet of the user equipment (UE) from a first layer different from an IP layer of the eNB in the IP layer, the processor configured to check whether or not the data packet of the UE corresponds to a data packet transmitted by the first layer using a header of the data packet, the processor, if the data packet of the UE corresponds of the UE to the data packet transmitted by the first layer, configured to add an IP header selected using a pre-stored mapping table to the data packet of the UE, the processor configured to deliver the data packet to which the IP header is added to a second layer corresponding to a lower layer, the processor configured to transmit the data packet to which the IP header is added to the network entity,
   wherein the first layer corresponds to a new L3 layer corresponding to a higher layer of a PDCP (Packet Data Convergence Protocol) layer, wherein the second layer corresponds to a GTP-U (General packet radio service Tunneling Protocol-U) layer, and wherein the network entity corresponds to an S-GW (Service Gateway).

7. The eNB of claim 6, wherein the mapping table is stored in a manner of matching an ID of a UE, an IP address of a UE, and a destination IP address with each other.

8. The eNB of claim 7, wherein if a plurality of destinations are matched with a single UE, a plurality of the destinations are identified by an identifier or an index.

9. The eNB of claim 6, wherein the processor is configured to receive a data packet rather than the data packet transmitted by the first layer and deliver the data packet rather than the data packet transmitted by the first layer to the second layer without adding the IP header.

10. The eNB of claim 6, wherein the data packet received from the first layer does not comprise IP information since the data packet does not undergo an IP layer of the user equipment.

\* \* \* \* \*